US011884133B2

(12) United States Patent
Han et al.

(10) Patent No.: US 11,884,133 B2
(45) Date of Patent: Jan. 30, 2024

(54) AIR CONDITIONING METHOD AND SYSTEM, VEHICLE, AND STORAGE MEDIUM

(71) Applicant: NIO TECHNOLOGY (ANHUI) CO., LTD, Hefei (CN)

(72) Inventors: Fang Han, Shanghai (CN); Ruipo Zhao, Shanghai (CN); Yan Song, Shanghai (CN); Guangming Tian, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

(21) Appl. No.: 17/832,852

(22) Filed: Jun. 6, 2022

(65) Prior Publication Data

US 2022/0388373 A1    Dec. 8, 2022

(30) Foreign Application Priority Data

Jun. 8, 2021  (CN) .......................... 202110636131.9

(51) Int. Cl.
*B60H 1/00*  (2006.01)

(52) U.S. Cl.
CPC ..... *B60H 1/00878* (2013.01); *B60H 1/00735* (2013.01)

(58) Field of Classification Search
CPC .. B60H 3/0028; B60H 3/0035; B60H 3/0014; B60H 3/0021; B60H 2003/0042; B60H 1/00878; B60H 1/00735
See application file for complete search history.

(56) References Cited

U.S. PATENT DOCUMENTS

| 5,297,988 | A | * | 3/1994 | Nishino | ............... | B60H 3/0035 |
| | | | | | | 454/157 |
| 5,429,180 | A | * | 7/1995 | Nishino | ............... | B60H 3/0035 |
| | | | | | | 165/41 |
| 6,371,451 | B1 | * | 4/2002 | Choi | ................... | B01F 23/2132 |
| | | | | | | 261/DIG. 89 |

(Continued)

FOREIGN PATENT DOCUMENTS

| DE | 102012021448 | | 5/2013 | | |
| JP | 2001253235 | A  * | 9/2001 | ........... | B60H 3/0021 |
| WO | WO 2014/044959 | | 3/2014 | | |

OTHER PUBLICATIONS

Extended Search Report for European Patent Application No. 22165230.8, dated Sep. 23, 2022, 9 pages.

*Primary Examiner* — Nelson J Nieves
(74) *Attorney, Agent, or Firm* — Sheridan Ross P.C.

(57) ABSTRACT

The present application relates to an air conditioning method and system, a vehicle, and a storage medium. The method comprises: determining an ambient temperature inside the vehicle; determining an operating state of a temperature regulation unit and a minimum air volume of an odor regulation unit in the operating state; receiving a setting of an intensity level of the odor regulation unit, wherein the temperature regulation unit shares an air passage with the odor regulation unit; and determining an air volume of the odor regulation unit according to the ambient temperature, the operating state, the minimum air volume, and the intensity level. According to this method, the release degree of the fragrance or the like inside the vehicle may be precisely controlled.

11 Claims, 6 Drawing Sheets

(56) References Cited

U.S. PATENT DOCUMENTS

| | | | | |
|---|---|---|---|---|
| 6,887,299 | B2* | 5/2005 | Weigl | A61L 9/12 |
| | | | | 422/5 |
| 9,914,341 | B2* | 3/2018 | Ono | B60H 3/0035 |
| 2003/0186643 | A1* | 10/2003 | Feuillard | B60H 3/0007 |
| | | | | 454/157 |
| 2009/0242656 | A1* | 10/2009 | Peard | B60H 3/0092 |
| | | | | 165/138 |
| 2010/0237649 | A1* | 9/2010 | Concina | B60H 3/0085 |
| | | | | 296/70 |
| 2015/0068705 | A1* | 3/2015 | Kim | B60H 3/0021 |
| | | | | 165/42 |
| 2016/0236542 | A1* | 8/2016 | Stiehler | B60H 3/0035 |
| 2019/0070937 | A1* | 3/2019 | Yoshimatsu | B60H 3/0035 |
| 2019/0077228 | A1* | 3/2019 | Goto | B60H 3/0021 |
| 2019/0184792 | A1* | 6/2019 | Watanabe | B60H 3/0035 |
| 2020/0254852 | A1* | 8/2020 | Gee | A61L 9/015 |
| 2020/0331325 | A1* | 10/2020 | Park | F26B 19/005 |
| 2021/0309079 | A1* | 10/2021 | Sakai | B60H 3/0035 |
| 2022/0266661 | A1* | 8/2022 | Duvert | G06F 3/01 |

\* cited by examiner

AIR CONDITIONING METHOD AND SYSTEM, VEHICLE, AND STORAGE MEDIUM

CROSS-REFERENCE TO RELATED APPLICATION

This application claims the benefit of China Patent Application No. 202110636131.9 filed Jun. 8, 2021, the entire contents of which are incorporated herein by reference in its entirety.

TECHNICAL FIELD

The present application relates to the field of vehicle air conditioning, and in particular to air conditioning method and system, a vehicle, and a storage medium.

BACKGROUND ART

At present, a fragrance system integrated with a vehicle air conditioning system is limited to an operating state of an air conditioner, and is capable of releasing fragrance only when the air conditioner is on and operates in a blowing mode. A few fragrance systems are capable of operating independently of air conditioning systems, which can be switched on and off independently, but require separate air passages and outlets provided for the fragrance systems. In addition, the regulation of some fragrance systems is not precise enough, and fragrance is sometimes strong and sometimes light in different environments, which may also significantly affect the moods of drivers.

SUMMARY OF THE INVENTION

Embodiments of the present application provide an air conditioning method and system, a vehicle, and a storage medium. The air conditioning method and system is used for more precisely controlling release of the fragrance inside a vehicle, thereby freshening the air inside the vehicle.

According to an aspect of the present application, an air conditioning method for a vehicle is provided, comprising: determining an ambient temperature inside the vehicle; determining an operating state of a temperature regulation unit and a minimum air volume of an odor regulation unit in the operating state; receiving a setting of an intensity level of the odor regulation unit; and determining an air volume of the odor regulation unit according to the ambient temperature, the operating state, the minimum air volume, and the intensity level.

In some embodiments of the present application, optionally, air volume output of the odor regulation unit is stopped where the ambient temperature is higher than a first threshold.

In some embodiments of the present application, optionally, the air volume of the odor regulation unit includes a basic air volume at the intensity level, and the basic air volume is pre-calibrated by the following method: calibrating a basic air volume based on a default operating state and a default ambient temperature at each intensity level according to the minimum air volume.

In some embodiments of the present application, optionally, the air volume of the odor regulation unit further comprises a compensation air volume at the intensity level, which is used for correcting the basic air volume.

In some embodiments of the present application, optionally, the operating state comprises a fan air volume of the temperature regulation unit, and the compensation air volume is determined on the basis of the fan air volume; the compensation air volume is determined on the basis of the ambient temperature where the ambient temperature is not higher than the first threshold; and/or the compensation air volume is determined on the basis of an outside air circulation ratio of the temperature regulation unit.

In some embodiments of the present application, optionally, where the superposition of the compensation air volume and the basic air volume is greater than the minimum air volume, the superposition of the compensation air volume and the basic air volume is taken as the air volume of the odor regulation unit; otherwise, the minimum air volume is taken as the air volume of the odor regulation unit.

According to another aspect of the present application, a vehicle air conditioning system is provided, comprising: a temperature regulation unit configured to detect and regulate an ambient temperature inside a vehicle; and an odor regulation unit configured to receive a setting of an intensity level thereof and to determine an air volume of the odor regulation unit according to the ambient temperature, an operating state of the temperature regulation unit, a minimum air volume of the odor regulation unit in the operating state, and the intensity level, wherein the temperature regulation unit shares an air passage with the odor regulation unit.

In some embodiments of the present application, optionally, the odor regulation unit is configured to stop the air volume output of the odor regulation unit where the ambient temperature is higher than the first threshold.

In some embodiments of the present application, optionally, the odor regulation unit is configured to determine a basic air volume at the intensity level, and the basic air volume is pre-calibrated by the following method: calibrating a basic air volume based on a default operating state and a default ambient temperature at each intensity level according to the minimum air volume.

In some embodiments of the present application, optionally, the air volume of the odor regulation unit is further configured to determine a compensation air volume at the intensity level and to correct the basic air volume with the compensation air volume.

In some embodiments of the present application, optionally, the operating state comprises a fan air volume of the temperature regulation unit, and the odor regulation unit is configured to determine the compensation air volume on the basis of the fan air volume; the odor regulation unit is configured to determine the compensation air volume on the basis of the ambient temperature where the ambient temperature is not higher than the first threshold; and/or the odor regulation unit is configured to determine the compensation air volume also on the basis of an outside air circulation ratio of the temperature regulation unit.

In some embodiments of the present application, optionally, the odor regulation unit is configured to: take the superposition of the compensation air volume and the basic air volume as the air volume of the odor regulation unit where the superposition of the compensation air volume and the basic air volume is greater than the minimum air volume; otherwise, the minimum air volume is taken as the air volume of the odor regulation unit.

According to a further aspect of this application, a vehicle is provided, comprising any one of the vehicle air conditioning systems as described above.

According to yet a further aspect of the present application, a computer-readable storage medium is provided, wherein the computer-readable storage medium stores instructions, and the instructions, when executed by a processor, cause the processor to perform any one of the foregoing methods.

BRIEF DESCRIPTION OF THE DRAWINGS

The above and other objectives and advantages of this application will be more thorough and clearer from the following detailed description in conjunction with the drawings, where the same or similar elements are represented by the same reference numerals.

DETAILED DESCRIPTION OF EMBODIMENTS

For the sake of brevity and illustrative purposes, the principles of this application are mainly described herein with reference to its exemplary embodiments. However, those skilled in the art can easily appreciate that the same principle can be equivalently applied to all types of vehicle air conditioning methods and systems, vehicles, and storage media, and a same or similar principle can be implemented. These variations do not depart from the true spirit and scope of this application.

It should be noted that the air conditioning system in some examples of the invention refers to a system having a temperature regulation function and an odor regulation function, and in some examples, it only refers to a unit module of the air conditioning system that implements the temperature regulation function, and is also referred to as an air conditioning system for short herein.

The context of the invention sets forth the setting of the air volume of the odor regulation unit, which may be specifically achieved by regulating the rotational speed of a fan of the odor regulation unit.

Figure 1:
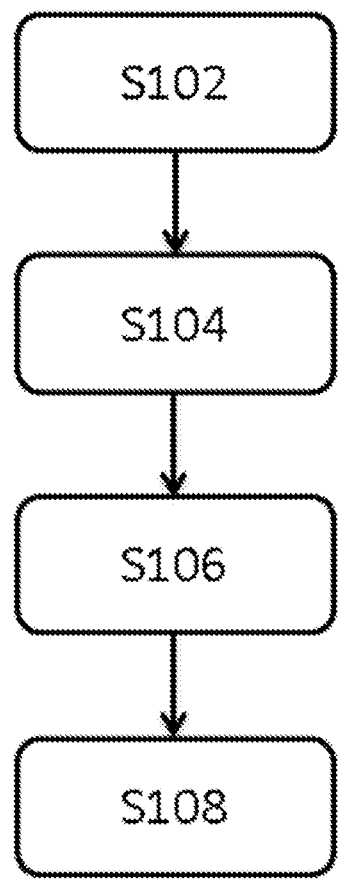
FIG. 1 illustrates an air conditioning method for a vehicle according to an embodiment of the present application.

According to an aspect of the present application, an air conditioning method for a vehicle is provided. As shown in FIG. 1, the air conditioning method 10 comprises the following processes. It should be noted that although one possible sequence is shown in FIG. 1, the invention is not limited thereto. In other examples, the sequence of the processes shown in FIG. 1 may be changed. The air conditioning method 10 determines an ambient temperature inside the vehicle in step S102, determines an operating state of a temperature regulation unit and a minimum air volume of an odor regulation unit in the operating state in step S104, receives the setting of an intensity level of the odor regulation unit in step S106, and determines an air volume of the odor regulation unit in step S108 according to the ambient temperature determined in step S102, the operating state and the minimum air volume determined in step S104 and the setting of the intensity level received in step S106. In the following example, the basic principle of the air conditioning method 10 will be described by taking fragrance as an example, the release of scent such as the fragrance may be precisely controlled by means of these above steps of the air conditioning method 10, achieving the effect of purifying air.

The air conditioning method 10 determines the ambient temperature inside the vehicle in step S102. According to the theory of molecular motion, the motion and diffusion of fragrance molecules are related to the temperature, so that the amount of the fragrance molecules (the intensity of the smell) that are sensible by the human olfactory system is also related to the ambient temperature. Accordingly, the ambient temperature may be detected prior to determining how to release the fragrance at least in part on the basis of the detected temperature.

The air conditioning method 10 determines the operating state of the temperature regulation unit in step S104. Since the temperature regulation unit (for example, a vehicle-mounted air conditioning system) shares an air passage with the odor regulation unit (for example, a fragrance system) to be described later, the operating state (such as on or off, on, and the rotational speed of the fan) of the temperature regulation unit will affect the operation of the odor regulation unit. In some examples of the invention, the manner in which the fragrance is released may be determined at least in part on the basis of the operating state of the temperature regulation unit.

Figure 3:
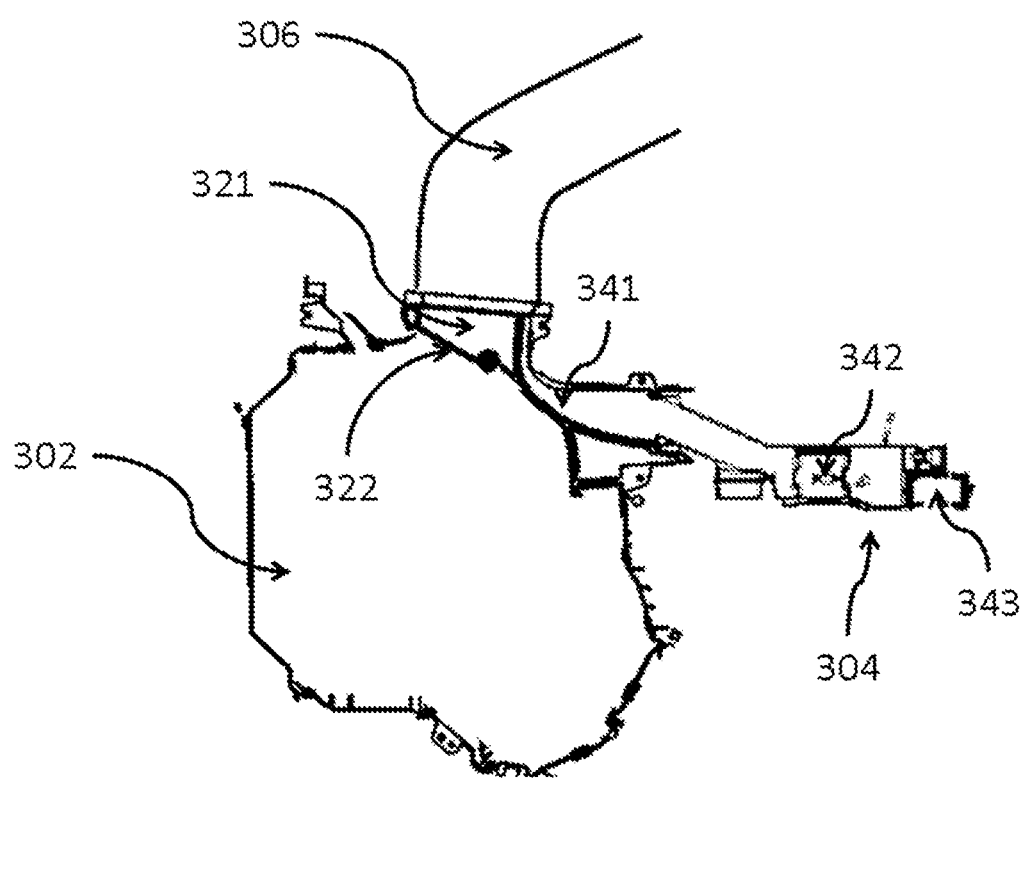
FIG. 3 illustrates an operating mode of a vehicle air conditioning system according to an embodiment of the present application.

FIG. 3 illustrates an example in which the temperature regulation unit and the odor regulation unit share the air passage. As shown in figure, an air conditioning system 302 shares an air passage 306 with the fragrance system 304. An air flow from the air conditioning system 302 passes through a first air passage 321, an air flow from the fragrance system 304 passes through a second air passage 341, and the two air flows then are converged into the air passage 306. It's worth noting that when the air conditioning system 302 is in operation, a pressure generated at an outlet of the first air passage 321 may be greater than a pressure at an outlet of the second air passage 341, and thus the air flow from the second air passage 341 will be significantly affected by the air flow from the first air passage 321. That is to say, the air conditioning system 302 will affect the operation of the fragrance system 304 to some degree. In some examples of the invention, the operating state of the temperature regulation unit may be determined prior to configuring the operating mode of the fragrance system at least in part on the basis of the operating state thereof.

Figure 6:
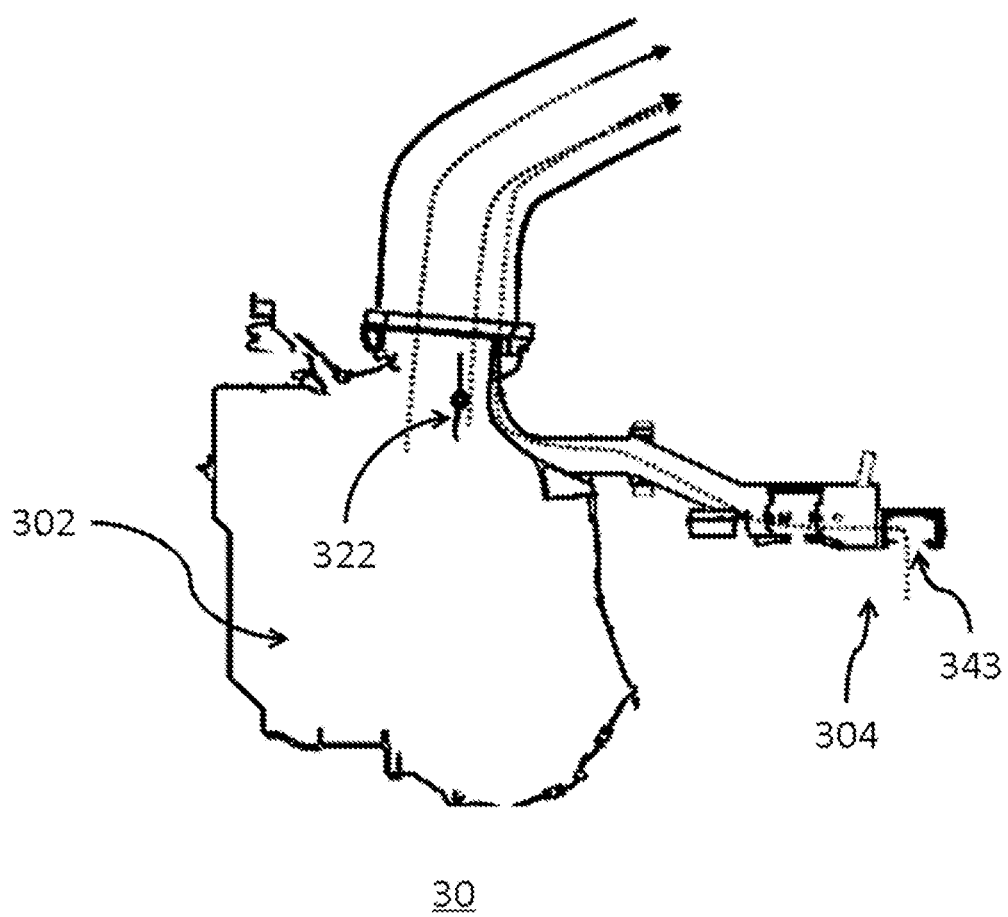
FIG. 6 illustrates an operating mode of a vehicle air conditioning system according to an embodiment of the present application.

In some examples, the minimum air volume of the odor regulation unit may be determined on the basis of the operating state of the temperature regulation unit. As shown in FIG. 6, the air conditioning system 302 and the fragrance system 304 are simultaneously turned on. Specifically, an air door 322 of the air conditioning system 302 is kept in an on state, and the fan 343 of the fragrance system 304 is also in the on state. In order to allow the fragrance in the fragrance system 304 to be rapidly and controllably diffused under various settings of the air conditioning system 302 and the air outlet, so as not to generate adverse effects such as reverse flow and backward flow which are unexpected in design, the fan 343 should at least ensure the output of the minimum air volume.

The following table is an example of a minimum rotational speed requirement for the fan 343 of the fragrance system 304 in order to ensure that the fragrance is blowable out under different operating conditions of the air conditioning system 302 for a vehicle type. The rotational speed of the fan 343 of the fragrance system 304 needs to be regulated to ensure that the outlet of the second air passage 341 of the fragrance system 304 is capable of overcoming a corresponding back pressure.

| Operating condition of air conditioning system | Air volume under different operating conditions of air conditioning system (CMH) | Back pressure (Pa) required to be overcome by minimum rotation speed of fan of fragrance system |
|---|---|---|
| 1 | 89.46 | 10.02 |
| 2 | 122.29 | 18.73 |
| 3 | 153.48 | 29.50 |
| 4 | 188.77 | 44.63 |
| 5 | 229.81 | 66.15 |
| 6 | 283.16 | 100.42 |
| 7 | 350.22 | 153.62 |
| 8 | 435.00 | 237.00 |

To this end, the rotational speed of the fan 343 of the fragrance system 304 and the operating state (such as a fan gear thereof) of the air conditioning system 302 may be matched in development to ensure that no reverse flow problem resulting in the fragrance not being blown out occurs. The flow formed by the rotational speed overcoming the back pressure to ensure that the fragrance is blowable out is referred to as the minimum air volume, which is related to the operating state of the temperature regulation unit (for example, the operating condition in the table above). The following table shows an example of a minimum air volume setting determined on the basis of the operating state of the temperature regulation unit.

| Operating condition of air conditioning system | Minimum air volume of fragrance system |
|---|---|
| 1 | M1 |
| 2 | M2 |
| 3 | M3 |
| 4 | M4 |
| 5 | M5 |
| 6 | M6 |
| 7 | M7 |
| 8 | M8 |

The air conditioning method 10 receives the setting of the intensity level of the odor regulation unit in step S106. The setting of the intensity level of the odor regulation unit may include on and off settings, and if the odor regulation unit is not turned on, it may be considered that level 0 is enabled. Where possible, if there are multiple fragrance levels available for selection, settings including fragrance level selection may also be received in step S106.

The air conditioning method 10 determines the air volume of the odor regulation unit in step S108 according to the ambient temperature detected in step S102, the operating state determined in step S104, and the setting of the odor regulation unit received in step S106. Although the influences of the ambient temperature, the operating state and the setting of the air volume of the odor regulation unit are simultaneously considered in step S108, these influences may have different weights. In some examples, where a certain influence (or some influences) is dominant, it is even possible to neglect a certain influence (or some influences), namely, the influence(s) is negligible when the air volume of the odor regulation unit is determined.

In some embodiments of the present application, the process of determining the air volume in step S108 may specifically comprise: stopping the air volume output of the odor regulation unit where the detected ambient temperature is higher than a first threshold. For example, after the vehicle is exposed to the blazing sun, the temperature inside the vehicle is high, turning on the odor regulation unit in this situation will result in dissipation of lots of fragrances, etc. In some examples, if the temperature inside the vehicle is higher than 40° C., the odor regulation unit is no longer turned on, thereby reducing unnecessary consumption. Referring again to FIG. 3, the fan 343 in the fragrance system 304 is used to control the output air flow so that the air flow output can be stopped by adjusting the fan 343 of the fragrance system 304.

In some embodiments of the present application, the air volume of the odor regulation unit comprises the basic air volume at the intensity level, and the basic air volume at each level is pre-calibrated by the following method.

In some examples, the basic air volume based on a default operating state and a default ambient temperature at each intensity level may be calibrated according to the minimum air volume. For example, the default operating state is that the fan of the air conditioning system 302 is turned off, and the default ambient temperature is 10° C. to 30° C. The determination criterion of the basic air volume is a common operating condition of the common fragrance system 304, which, on the one hand, reduces the computational complexity of a compensation air volume to be described in detail below, and on the other hand, facilitates fast determination of an actual output air volume. In some examples, since the determination criterion of the basic air volume corresponds to a common operating condition of the vehicle, the compensation air volume may be 0, and the actual output air volume is equal to the basic air volume. The following table shows an example of a basic air volume setting determined on the basis of the operating state of the thermostat unit (assuming that the fragrance system 304 has only two levels). Calibration may be performed by means of on-site calibration and theoretical calculation, which will not be described in detail herein. The results of calibration may, for example, be stored in tabular form to be recalled in the process of determining the air volume.

| Operating condition of air conditioning system | Concentration level | Basic air volume of fragrance system |
|---|---|---|
| 1 | Low | L1 |
| 2 | Low | L2 |
| 3 | Low | L3 |
| 4 | Low | L4 |
| 5 | Low | L5 |
| 6 | Low | L6 |
| 7 | Low | L7 |
| 8 | Low | L8 |
| 1 | High | L9 |
| 2 | High | L10 |
| 3 | High | L11 |
| 4 | High | L12 |
| 5 | High | L13 |
| 6 | High | L14 |
| 7 | High | L15 |
| 8 | High | L16 |

In some embodiments of the present application, the air volume of the odor regulation unit further comprises the compensation air volume at the intensity level received in step S106, and the compensation air volume is used for correcting the basic air volume described above. The compensation herein and in the context of the present application may also be either a positive compensation or a negative compensation.

In some embodiments of the present application, the operating state of the temperature regulation unit comprises a fan air volume of the temperature regulation unit, and the compensation air volume may be specifically determined on the basis of the fan air volume in step S108. The following table shows a setting of the compensation air volume where only the fan air volume is considered.

| Compensation air volume of fragrance system | Criteria |
|---|---|
| f1 | Fan air volume is <= 40%; intensity level: low |
| f2 | 40% < fan air volume <= 60%; intensity level: low |
| f3 | 60% < fan air volume; intensity level: low |
| f4 | Fan air volume is <= 40%; intensity level: high |
| f5 | 40% < fan air volume <= 60%; intensity level: high |
| f6 | 60% < fan air volume; intensity level: high |
| 0 | Others |

When the air volume of, for example, the fan (not shown) of the air conditioning system 302 in FIG. 3 is large, the compensation air volume may be increased, thereby more facilitating the release of fragrance of the fragrance system 304 from the second air passage 341.

In some embodiments of the present application, where the ambient temperature is not higher than the first threshold (with continuing reference to the above example, for example 40° C.), the compensation air volume may be specifically determined on the basis of the ambient temperature in step S108. The following table shows the setting of the compensation air volume where only the ambient temperature is considered.

| Compensation air volume of fragrance system | Criteria |
|---|---|
| d1 | Ambient temperature <= 10° C.; intensity level: low |
| d2 | 10° C. < ambient temperature <= 30° C.; intensity level: low |
| d3 | 30° C. < ambient temperature <= 40° C.; intensity level: low |
| d4 | Ambient temperature <= 10° C.; intensity level: high |
| d5 | 10° C. < ambient temperature <= 30° C.; intensity level: high |
| d6 | 30° C. < ambient temperature <= 40° C.; intensity level: high |
| 0 | Others |

In some examples, if the set level of the odor regulation unit is a default value (such as a default level), the air volume of the odor regulation unit may be determined only according to the intensity level, the ambient temperature, and the operating state of the temperature regulation unit. For example, if the intensity level is low, the operating state of the temperature regulation unit is "condition 7" and the current ambient temperature is between 10° C. and 30° C., the air volume of the odor regulation unit may be determined as: L7+d2. In some examples, when the ambient temperature is too low or too high, the compensation air volume may be set slightly larger to ensure that more fragrance molecules remain in the interior space of the vehicle.

In some embodiments of the present application, the compensation air volume may be specifically determined on the basis of an outside air circulation ratio of the temperature regulation unit in step S108. The following table shows the setting of the compensation air volume where only the outside air circulation ratio is considered.

| Compensation air volume of fragrance system | Criteria |
|---|---|
| c1 | 100% recirculation; 100% outside air circulation ratio; intensity level: low |
| c2 | 100% recirculation; 40% <= outside air circulation ratio < 100%; intensity level: low |
| c3 | 100% recirculation; 35% <= outside air circulation ratio < 40%; intensity level: low |
| c4 | 100% recirculation; 25% <= outside air circulation ratio < 35%; intensity level: low |
| c5 | 100% recirculation; 15% <= outside air circulation ratio < 25%; intensity level: low |
| c6 | 100% recirculation; outside air circulation ratio < 15%; intensity level: low |
| c7 | 100% recirculation; 100% outside air circulation ratio; intensity level: high |
| c8 | 100% recirculation; 40% <= outside air circulation ratio < 100%; intensity level: high |
| c9 | 100% recirculation; 35% <= outside air circulation ratio < 40%; intensity level: high |
| c10 | 100% recirculation; 25% <= outside air circulation ratio < 35%; intensity level: high |
| c11 | 100% recirculation; 15% <= outside air circulation ratio < 25%; intensity level: high |
| c12 | 100% recirculation; outside air circulation ratio < 15%; intensity level: high |
| 0 | Others |

When the outside air circulation ratio of the temperature regulation unit is increased, blown external air will have a dilution effect on the internal fragrance, so that when the outside air circulation ratio is too large, the compensation air volume may be appropriately increased in order to volatilize more fragrance more quickly.

It is to be noted that the above example shows that the compensation air volume of the odor regulation unit is set where the fan air volume of the temperature regulation unit, the ambient temperature, the outside air circulation ratio of the temperature regulation unit, etc. are considered separately, but these factors may also be combined to set the compensation air volume of the odor regulation unit (for example, according to at least one of the factors). For example, if the ambient temperature and the operating state of the temperature regulation unit are simultaneously considered, a configuration solution as shown in the following table may be formed.

| Compensation air volume of fragrance system | Criteria |
|---|---|
| z1 | Ambient temperature <= 10° C.; 100% recirculation; 100% outside air circulation ratio; intensity level: low |
| z2 | 10° C. < ambient temperature <= 30° C.; 100% recirculation; 40% <= outside air circulation ratio < 100%; intensity level: low |
| z3 | 30° C. < ambient temperature <= 40° C.; 100% recirculation; 35% <= outside air circulation ratio < 40%; intensity level: low |
| ... | ... |
| 0 | Others |

According to the above configuration solution, for example, if the operating state of the temperature regulation unit is "condition 7", the current ambient temperature is between 10° C. and 30° C., the recirculation ratio is 100%, the outside air circulation ratio is greater than or equal to 40% and less than 100%, and the intensity level is low, the air volume of the odor regulation unit can be determined to be L7+z2.

In some embodiments of the present application, where the superposition of the compensation air volume and the basic air volume is greater than the minimum air volume, the superposition of the compensation air volume and the basic air volume is taken as the air volume of the odor regulation unit; otherwise, the minimum air volume is taken as the air volume of the odor regulation unit. In this way, it is possible to avoid the reverse flow described above in the case of being less than the minimum air volume. In other examples, it is also possible to stop the air volume output of the odor regulation unit where the superposition of the compensation air volume and the basic air volume is less than the basic air volume.

Figure 2:
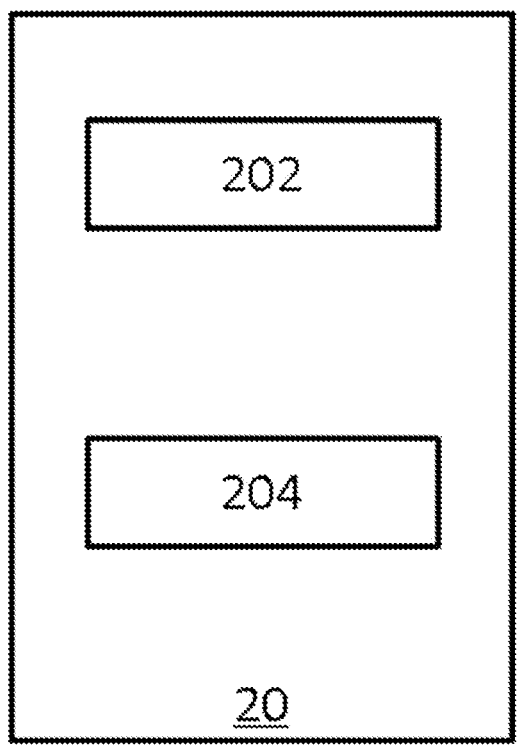
FIG. 2 illustrates a vehicle air conditioning system according to an embodiment of the present application.

According to another aspect of the present application, a vehicle air conditioning system is provided. As shown in FIG. 2, the vehicle air conditioning system comprises a temperature regulation unit 202 and an odor regulation unit 204, and the temperature regulation unit 202 shares an air passage with the odor regulation unit 204. The temperature regulation unit 202 is configured to detect and regulate the ambient temperature inside the vehicle. The odor regulation unit 204 is configured to receive a setting of the intensity level thereof, and the odor regulation unit 204 is further configured to determine an air volume of the odor regulation unit according to the ambient temperature, the operating state of the temperature regulation unit 202, the minimum air volume of the odor regulation unit in the operating state, and the intensity level of the odor regulation unit 204.

In some examples, according to the theory of molecular motion, the motion and diffusion of fragrance molecules are related to the temperature, so that the amount of the fragrance molecules (the intensity of the smell) that are sensible by the human olfactory system is also related to the ambient temperature. Accordingly, the ambient temperature may be detected prior to determining how to release the fragrance at least in part on the basis of the detected temperature.

In some examples, since the temperature regulation unit 202 shares the air passage with the odor regulation unit 204 (for example, a fragrance system) to be described later, the operating state (such as on or off, on, and the rotational speed of the fan) of the temperature regulation unit 202 will affect the operation of the odor regulation unit 204. In some examples of the invention, the manner in which the fragrance is released may be determined at least in part on the basis of the operating state of the temperature regulation unit 202.

The air flow from the air conditioning system 302 as described above passes through a first air passage 321, the air flow from the fragrance system 304 passes through a second air passage 341 by flowing through a fragrance box 342, and the two air flows then are converged into the air passage 306. It's worth noting that when the air conditioning system 302 is in operation, a pressure generated at an outlet of the first air passage 321 may be greater than a pressure at an outlet of the second air passage 341, and thus the air flow from the second air passage 341 will be significantly affected by the air flow from the first air passage 321. That is to say, the air conditioning system 302 will affect the operation of the fragrance system 304 to some degree. Accordingly, in some examples of the invention, the operating state of the temperature regulation unit 202 may be determined prior to configuring the operating mode of the fragrance system at least in part on the basis of the operating state thereof.

In some examples, the minimum air volume of the odor regulation unit may be determined on the basis of the operating state of the temperature regulation unit. As shown in FIG. 6, the air conditioning system 302 and the fragrance system 304 are simultaneously turned on. Specifically, an air door 322 of the air conditioning system 302 is kept in an on state, and the fan 343 of the fragrance system 304 is also in the on state. In order to allow the fragrance in the fragrance system 304 to be rapidly and controllably diffused under various settings of the air conditioning system 302 and the air outlet, so as not to generate adverse effects such as reverse flow and backward flow which are unexpected in design, the fan 343 should at least ensure the output of the minimum air volume.

The following table is an example of a minimum rotational speed requirement for the fan 343 of the fragrance system 304 in order to ensure that the fragrance is blowable out under different operating conditions of the air conditioning system 302 for a vehicle type. The rotational speed of the fan 343 of the fragrance system 304 needs to be regulated to ensure that the outlet of the second air passage 341 of the fragrance system 304 is capable of overcoming a corresponding back pressure.

| Operating condition of air conditioning system | Air volume under different operating conditions of air conditioning system (CMH) | Back pressure (Pa) required to be overcome by minimum rotation speed of fan of fragrance system |
| --- | --- | --- |
| 1 | 89.46 | 10.02 |
| 2 | 122.29 | 18.73 |
| 3 | 153.48 | 29.50 |
| 4 | 188.77 | 44.63 |
| 5 | 229.81 | 66.15 |
| 6 | 283.16 | 100.42 |
| 7 | 350.22 | 153.62 |
| 8 | 435.00 | 237.00 |

To this end, the rotational speed of the fan 343 of the fragrance system 304 and the operating state (such as a fan gear thereof) of the air conditioning system 302 may be matched in development to ensure that no reverse flow problem resulting in the fragrance not being blown out occurs. The flow formed by the rotational speed overcoming the back pressure to ensure that the fragrance is blowable out is referred to as the minimum air volume, which is related to the operating state of the temperature regulation unit 202 (for example, the operating condition in the table above). The following table shows an example of a minimum air volume setting determined on the basis of the operating state of the temperature regulation unit 202.

| Operating condition of air conditioning system | Minimum air volume of fragrance system |
| --- | --- |
| 1 | M1 |
| 2 | M2 |
| 3 | M3 |
| 4 | M4 |
| 5 | M5 |
| 6 | M6 |

| Operating condition of air conditioning system | Minimum air volume of fragrance system |
| --- | --- |
| 7 | M7 |
| 8 | M8 |

Figure 4:
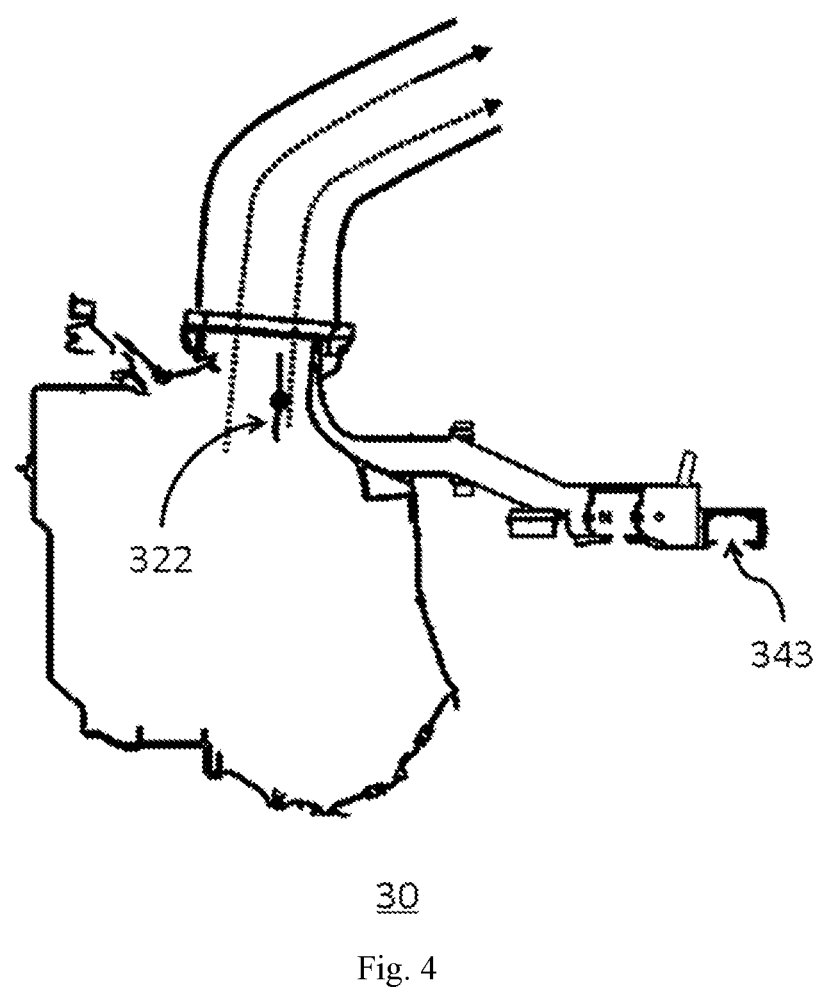
FIG. 4 illustrates an operating mode of a vehicle air conditioning system according to an embodiment of the present application.
Figure 5:
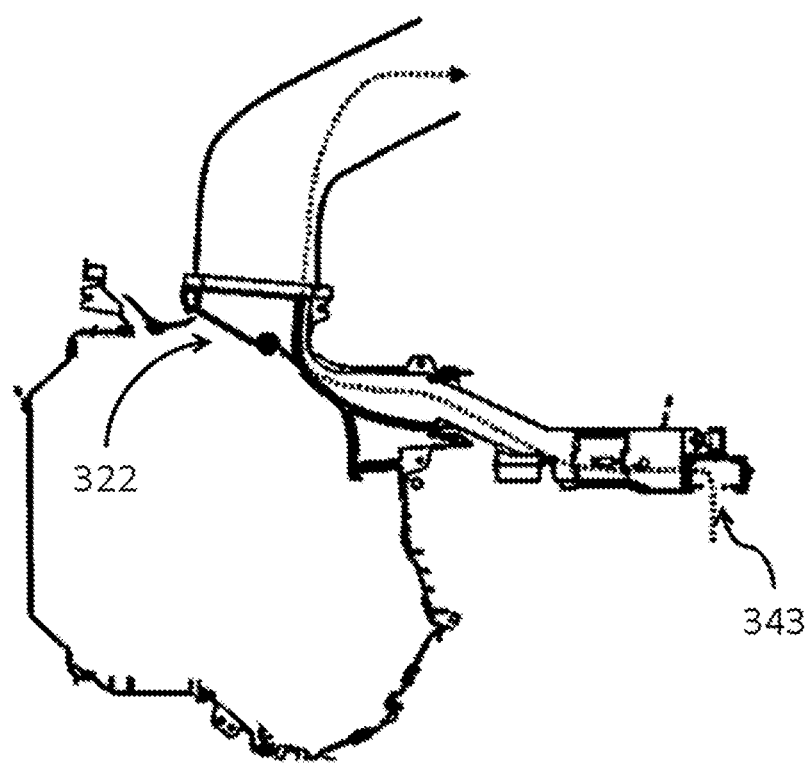
FIG. 5 illustrates an operating mode of a vehicle air conditioning system according to an embodiment of the present application.

FIGS. 3-6 illustrate the air conditioning system 302 and the fragrance system 304 that share the air passage 306. In the example of FIG. 3, both the air conditioning system 302 and the fragrance system 304 are in an off state, which is specifically embodied as the air door 322 (and a fan thereof, not shown) of the air conditioning system 302 being closed, and the fan 343 of the fragrance system 304 stops operating. In the example of FIG. 4, only the air conditioning system 302 is turned on, and in this case, the air door 322 (and the fan thereof, not shown) remains in an open state. The fan 343 of the fragrance system 304 stops operating. In the example of FIG. 5, only the fragrance system 304 is turned on, and in this case, the fan 343 remains in an on state. The air door 322 (and the fan thereof, not shown) of the air conditioning system 302 is closed. In the example of FIG. 6, both the air conditioning system 302 and the fragrance system 304 are in the on state, and in this case, the air door 322 (and the fan thereof, not shown) of the air conditioning system 302 remains in the open state and the fan 343 of the fragrance system 304 remains in the on state.

In some examples, the setting of the intensity level of the odor regulation unit 204 may include on and off settings, and if the odor regulation unit is not turned on, it may be considered that level 0 is enabled. Where possible, if there are multiple fragrance levels available for selection, the odor regulation unit 204 may also receive settings including fragrance level selection.

In some examples, the odor regulation unit 204 determines the air volume thereof on the basis of the ambient temperature, the operating state of the temperature regulation unit 202, and the settings of the odor regulation unit 204. Although the influences of the ambient temperature, the operating state and the setting of the air volume of the odor regulation unit 204 are simultaneously considered, these influences may have different weights. In some examples, where a certain influence (or some influences) is dominant, it is even possible to neglect a certain influence (or some influences), namely, the influence(s) is negligible when the air volume of the odor regulation unit 204 is determined.

In some embodiments of the present application, the odor regulation unit 204 is configured to stop the air volume output of the odor regulation unit 204 if the ambient temperature is higher than the first threshold. For example, after the vehicle is exposed to the blazing sun, the temperature inside the vehicle is high, turning on the odor regulation unit 204 in this situation will result in dissipation of lots of fragrances, etc. In some examples, if the temperature inside the vehicle is higher than 40° C., the odor regulation unit is no longer turned on, thereby reducing unnecessary consumption. Referring again to FIG. 3, the fan 343 in the fragrance system 304 is used to control the output air flow so that the air flow output can be stopped by adjusting the fan 343 of the fragrance system 304.

In some embodiments of the present application, the odor regulation unit 204 is configured to determine the basic air volume at the received intensity level, and the basic air volume at each level may be pre-calibrated by the following method.

In some examples, the basic air volume based on a default operating state and a default ambient temperature at each intensity level may be calibrated according to the minimum air volume. For example, the default operating state is that the fan of the air conditioning system 302 is turned off, and the default ambient temperature is 10° C. to 30° C. The determination criterion of the basic air volume is a common operating condition of the common fragrance system 304, which, on the one hand, reduces the computational complexity of a compensation air volume to be described in detail below, and on the other hand, facilitates fast determination of an actual output air volume. In some examples, since the determination criterion of the basic air volume corresponds to a common operating condition of the vehicle, the compensation air volume may be 0, and the actual output air volume is equal to the basic air volume. The following table shows an example of a basic air volume setting determined on the basis of the operating state of the thermostat unit (assuming that the fragrance system 304 has only two levels). Calibration may be performed by means of on-site calibration and theoretical calculation, which will not be described in detail herein. The results of calibration may, for example, be stored in tabular form to be recalled in the process of determining the air volume.

| Operating condition of air conditioning system | Concentration level | Basic air volume of fragrance system |
| --- | --- | --- |
| 1 | low | L1 |
| 2 | low | L2 |
| 3 | low | L3 |
| 4 | low | L4 |
| 5 | low | L5 |
| 6 | low | L6 |
| 7 | low | L7 |
| 8 | low | L8 |
| 1 | high | L9 |
| 2 | high | L10 |
| 3 | high | L11 |
| 4 | high | L12 |
| 5 | high | L13 |
| 6 | high | L14 |
| 7 | high | L15 |
| 8 | high | L16 |

In some embodiments of the present application, the air volume of the odor regulation unit is further configured to determine the compensation air volume corresponding to the received intensity set level, and the compensation air volume is used for correcting the basic air volume described above. The compensation herein and in the context of the present application may also be either a positive compensation or a negative compensation.

In some embodiments of the present application, the operating state comprises a fan air volume of the temperature regulation unit 202, and the odor regulation unit 204 is configured to determine the compensation air volume on the basis of the fan air volume of the temperature regulation unit 202. The following table shows a setting of the compensation air volume where only the fan air volume is considered.

| Compensation air volume of fragrance system | Criteria |
| --- | --- |
| f1 | Fan air volume is <= 40%; intensity level: low |
| f2 | 40% < fan air volume <= 60%; intensity level: low |
| f3 | 60% < fan air volume; intensity level: low |

| Compensation air volume of fragrance system | Criteria |
|---|---|
| f4 | Fan air volume is <= 40%; intensity level: high |
| f5 | 40% < fan air volume <= 60%; intensity level: high |
| f6 | 60% < fan air volume; intensity level: high |
| 0 | Others |

When the air volume of, for example, the fan (not shown) of the air conditioning system 302 in FIG. 3 is large, the compensation air volume may be increased, thereby more facilitating the release of fragrance of the fragrance system 304 from the second air passage 341.

In some embodiments of the present application, the odor regulation unit 204 is configured to determine the compensation air volume on the basis of the ambient temperature where the ambient temperature is not higher than the first threshold (with continuing reference to the above example, for example, 40° C.). The following table shows the setting of the compensation air volume where only the ambient temperature is considered.

| Compensation air volume of fragrance system | Criteria |
|---|---|
| d1 | Ambient temperature <= 10° C.; intensity level: low |
| d2 | 10° C. < ambient temperature <= 30° C.; intensity level: low |
| d3 | 30° C. < ambient temperature <= 40° C.; intensity level: low |
| d4 | Ambient temperature <= 10° C.; intensity level: high |
| d5 | 10° C. < ambient temperature <= 30° C.; intensity level: high |
| d6 | 30° C. < ambient temperature <= 40° C.; intensity level: high |
| 0 | Others |

In some examples, if the set level of the odor regulation unit 204 is a default value (such as a default level), the air volume of the odor regulation unit 204 may be determined only according to the intensity level, the ambient temperature, and the operating state of the temperature regulation unit 202. For example, if the intensity level is low, the operating state of the temperature regulation unit 202 is "condition 7" and the current ambient temperature is between 10° C. and 30° C., the air volume of the odor regulation unit 204 may be determined as: L7+d2. In some examples, when the ambient temperature is too low or too high, the compensation air volume may be set slightly larger to ensure that more fragrance molecules remain in the interior space of the vehicle.

In some embodiments of the present application, the odor regulation unit 204 is configured to determine the compensation air volume also on the basis of the outside air circulation ratio of the temperature regulation unit 202. The following table shows the setting of the compensation air volume where only the outside air circulation ratio is considered.

| Compensation air volume of fragrance system | Criteria |
|---|---|
| c1 | 100% recirculation; 100% outside air circulation ratio; intensity level: low |
| c2 | 100% recirculation; 40% <= outside air circulation ratio < 100%; intensity level: low |
| c3 | 100% recirculation; 35% <= outside air circulation ratio < 40%; intensity level: low |
| c4 | 100% recirculation; 25% <= outside air circulation ratio < 35%; intensity level: low |
| c5 | 100% recirculation; 15% <= outside air circulation ratio < 25%; intensity level: low |
| c6 | 100% recirculation; outside air circulation ratio < 15%; intensity level: low |
| c7 | 100% recirculation; 100% outside air circulation ratio; intensity level: high |
| c8 | 100% recirculation; 40% <= outside air circulation ratio < 100%; intensity level: high |
| c9 | 100% recirculation; 35% <= outside air circulation ratio < 40%; intensity level: high |
| c10 | 100% recirculation; 25% <= outside air circulation ratio < 35%; intensity level: high |
| c11 | 100% recirculation; 15% <= outside air circulation ratio < 25%; intensity level: high |
| c12 | 100% recirculation; outside air circulation ratio < 15%; intensity level: high |
| 0 | Others |

When the outside air circulation ratio of the temperature regulation unit 202 is increased, blown external air will have a dilution effect on the internal fragrance, so that when the outside air circulation ratio is too large, the compensation air volume may be appropriately increased in order to volatilize more fragrance more quickly.

It is to be noted that the above example shows that the compensation air volume of the odor regulation unit 204 is set where the fan air volume of the temperature regulation unit 202, the ambient temperature, the outside air circulation ratio of the temperature regulation unit 202, etc. are considered separately, but these factors may also be combined to set the compensation air volume of the odor regulation unit 204 (for example, according to at least one of the factors). For example, if the ambient temperature and the operating state of the temperature regulation unit 202 are simultaneously considered, a configuration solution as shown in the following table may be formed.

| Compensation air volume of fragrance system | Criteria |
|---|---|
| z1 | Ambient temperature <= 10° C.; 100% recirculation; 100% outside air circulation ratio; intensity level: low |
| z2 | 10° C. < ambient temperature <= 30° C.; 100% recirculation; 40% <= outside air circulation ratio < 100%; intensity level: low |
| z3 | 30° C. < ambient temperature <= 40° C.; 100% recirculation; 35% <= outside air circulation ratio < 40%; intensity level: low |
| . . . | . . . |
| 0 | Others |

According to the above configuration solution, for example, if the operating state of the temperature regulation unit 202 is "condition 7", the current ambient temperature is between 10° C. and 30° C., the recirculation ratio is 100%, the outside air circulation ratio is greater than or equal to 40% and less than 100%, and the intensity level is low, the air volume of the odor regulation unit 204 can be determined to be L7+z2.

In some embodiments of the present application, the odor regulation unit is configured to: take the superposition of the compensation air volume and the basic air volume as the air volume of the odor regulation unit where the superposition of the compensation air volume and the basic air volume is greater than the minimum air volume; otherwise, the minimum air volume is taken as the air volume of the odor regulation unit. In this way, it is possible to avoid the reverse flow described above in the case of being less than the minimum air volume. In other examples, it is also possible that the odor regulation unit is configured to stop the air volume output of the odor regulation unit where the superposition of the compensation air volume and the basic air volume is less than the minimum air volume.

According to a further aspect of this application, a vehicle is provided, comprising any one of the vehicle air conditioning systems as described above. Thus, the vehicle equipped with the air conditioning system will be capable of precisely regulating the degree of fragrance release.

According to yet a further aspect of this application, a computer-readable storage medium is provided, in which instructions are stored, and when the instructions are executed by a processor, the processor is enabled to perform any of the air conditioning methods described above. The computer-readable medium in this application includes various types of computer storage media, and may be any usable medium accessible to a general-purpose or special-purpose computer. For example, the computer-readable medium may include a RAM, a ROM, an EPROM, an E$^2$PROM, a register, a hard disk, a removable hard disk, a CD-ROM or another optical memory, a magnetic disk memory or another magnetic storage device, or any other transitory or non-transitory media that can carry or store expected program code having an instruction or data structure form and be accessible to the general-purpose or special-purpose computer or a general-purpose or special-purpose processor. Data is usually copied magnetically in a disk used herein, while data is usually copied optically by using lasers in a disc. A combination thereof shall also fall within the scope of protection of the computer-readable media. For example, the storage medium is coupled to a processor, so that the processor can read information from and write information to the storage medium. In an alternative solution, the storage medium may be integrated into the processor. The processor and the storage medium may reside in an ASIC. The ASIC may reside in a user terminal. In an alternative solution, the processor and the storage medium may reside as discrete assemblies in a user terminal.

The foregoing descriptions are merely the embodiments of this application, but are not intended to limit the protection scope of this application. Any feasible variation or replacement conceived by a person skilled in the art within the technical scope disclosed in this application shall fall within the scope of protection of this application. In the case of no conflict, the embodiments of this application and features in the embodiments may also be combined with each another. The scope of protection of this application shall be subject to recitations of the claims.

The invention claimed is:

1. An air conditioning method for a vehicle, comprising:
   determining an ambient temperature inside the vehicle;
   determining an operating state of a vehicle-mounted air conditioning system and a minimum air volume of a fragrance system including a fan in the operating state;
   receiving a setting of an intensity level of the fragrance system; and
   determining an air volume of the fragrance system according to the ambient temperature, the operating state, the minimum air volume, and the intensity level wherein the air volume of the fragrance system includes a basic air volume at the intensity level, and the basic air volume is pre-calibrated by the following method: calibrating a basic air volume based on a default operating state and a default ambient temperature at each intensity level according to the minimum air volume.

2. The method according to claim 1, wherein the air volume output of the fragrance system is stopped where the ambient temperature is higher than a first threshold.

3. The method according to claim 1, wherein the air volume of the fragrance system further comprises a compensation air volume at the intensity level, which is used for correcting the basic air volume.

4. The method according to claim 3, wherein the operating state comprises a fan air volume of the vehicle-mounted air conditioning system, and the compensation air volume is determined on the basis of the fan air volume;
   the compensation air volume is determined on the basis of the ambient temperature where the ambient temperature is not higher than the first threshold; and/or
   the compensation air volume is determined on the basis of an outside air circulation ratio of the vehicle-mounted air conditioning system.

5. The method according to claim 3, wherein the superposition of the compensation air volume and the basic air volume is taken as the air volume of the fragrance system where the superposition of the compensation air volume and the basic air volume is greater than the minimum air volume; otherwise, the minimum air volume is taken as the air volume of the fragrance system.

6. A vehicle air conditioning system, comprising:
   a vehicle-mounted air conditioning system configured to detect and regulate an ambient temperature inside a vehicle; and
   a fragrance system including a fan, the fragrance system is configured to receive a setting of an intensity level thereof and to determine an air volume of the fragrance system according to the ambient temperature, an operating state of the vehicle-mounted air conditioning system, a minimum air volume of the fragrance system in the operating state, and the intensity level, wherein the vehicle-mounted air conditioning system shares an air passage with the fragrance system, wherein the fragrance system is configured to determine a basic air volume at the intensity level which is pre-calibrated based on a default operating state and a default ambient temperature at each intensity level according to the minimum air volume.

7. The system according to claim 6, wherein the fragrance system is configured to stop the air volume output of the fragrance system where the ambient temperature is higher than a first threshold.

8. The system according to claim 6, wherein the fragrance system is further configured to determine a compensation air volume at the intensity level and to correct the basic air volume with the compensation air volume.

9. The system according to claim 8, wherein the operating state comprises a fan air volume of the vehicle-mounted air conditioning system, and the fragrance system is configured to determine the compensation air volume on the basis of the fan air volume;
   the fragrance system is configured to determine the compensation air volume on the basis of the ambient temperature where the ambient temperature is not higher than the first threshold; and/or the fragrance system is configured to determine the compensation air volume also on the basis of an outside air circulation ratio of the vehicle-mounted air conditioning system.

10. The system according to claim 8, wherein the fragrance system is configured to:

take the superposition of the compensation air volume and the basic air volume as the air volume of the fragrance system where the superposition of the compensation air volume and the basic air volume is greater than the minimum air volume;

otherwise, the minimum air volume is taken as the air volume of the fragrance system.

11. A vehicle, comprising the vehicle air conditioning system according to claim 6.

* * * * *